(12) United States Patent
Frost et al.

(10) Patent No.: US 10,218,610 B2
(45) Date of Patent: *Feb. 26, 2019

(54) MPLS SEGMENT ROUTING

(71) Applicant: Cisco Technology, Inc., San Jose, CA (US)

(72) Inventors: Daniel C. Frost, Feltham (GB); Stewart F. Bryant, Merstham (GB); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,744

(22) Filed: Jun. 29, 2017

(65) Prior Publication Data
US 2017/0302571 A1    Oct. 19, 2017

Related U.S. Application Data

(63) Continuation of application No. 14/717,665, filed on May 20, 2015, now Pat. No. 9,749,227, which is a (Continued)

(51) Int. Cl.
*H04L 12/723* (2013.01)
*H04L 12/721* (2013.01)
(Continued)

(52) U.S. Cl.
CPC ............. *H04L 45/50* (2013.01); *H04L 41/00* (2013.01); *H04L 45/02* (2013.01); *H04L 45/26* (2013.01);
(Continued)

(58) Field of Classification Search
CPC ......... H04L 45/50; H04L 45/66; H04L 45/38; H04L 45/44
See application file for complete search history.

(56) References Cited

U.S. PATENT DOCUMENTS 5,764,624 A   6/1998  Endo ............................. 370/218
6,032,197 A   2/2000  Birdwell ....................... 709/216
(Continued)

FOREIGN PATENT DOCUMENTS

CN    1726 679 A    1/2006  ............. H04L 12/56
CN    101247 253 A  8/2008  ............. H04L 12/18
(Continued)

OTHER PUBLICATIONS

Previdi, Stefano B. et al., "Segment Routing Extension Headers", U.S. Appl. No. 15/677,210, filed Aug. 15, 2017; consisting of Specification, Claims, Abstract, and Drawings (58 pages).
(Continued)

*Primary Examiner* — Albert T Chou
(74) *Attorney, Agent, or Firm* — Campbell Stephenson LLP

(57) ABSTRACT

A method, communications processing device, and computer readable medium for MPLS segment routing are disclosed. One embodiment of the method comprises generating a first link-state packet comprising a first data structure. The first data structure maps a first portcode to a link connecting the first router within the network or to an additional router reachable from the first router. The method embodiment further includes receiving an incoming data packet encapsulated with a header comprising an incoming portcode stack having the first portcode as its uppermost portcode. The method embodiment further includes removing the first portcode from the incoming portcode stack to create an outgoing portcode stack for an outgoing data packet, and forwarding the outgoing data packet via a port, of the first router, identified by the first portcode.

20 Claims, 6 Drawing Sheets

Related U.S. Application Data continuation of application No. 13/760,155, filed on Feb. 6, 2013, now Pat. No. 9,049,233.

(60) Provisional application No. 61/710,121, filed on Oct. 5, 2012.

(51) Int. Cl.
*H04L 12/751* (2013.01)
*H04L 12/717* (2013.01)
*H04L 29/06* (2006.01)
*H04L 12/24* (2006.01)
*H04L 12/775* (2013.01)

(52) U.S. Cl.
CPC .............. *H04L 45/38* (2013.01); *H04L 45/42* (2013.01); *H04L 45/44* (2013.01); *H04L 45/58* (2013.01); *H04L 45/66* (2013.01); *H04L 69/166* (2013.01); *H04L 45/34* (2013.01)

(56) References Cited

U.S. PATENT DOCUMENTS

| | | | |
|---|---|---|---|
| 6,147,976 A | 11/2000 | Shand | 370/254 |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn et al. | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,848,728 B1 | 9/2014 | Revah | 370/386 |
| 8,953,590 B1 | 2/2015 | Aggarwal | 370/389 |
| 9,036,474 B2 | 5/2015 | Dibirdi et al. | 370/235 |
| 9,049,233 B2* | 6/2015 | Frost | H04L 69/166 |
| 9,094,337 B2 | 7/2015 | Bragg | |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 9,571,349 B2 | 2/2017 | Previdi et al. | |
| 9,660,897 B1 | 5/2017 | Gredler | |
| 9,749,227 B2* | 8/2017 | Frost | H04L 45/50 |
| 2001/0037401 A1 | 11/2001 | Soumiya | 709/232 |
| 2001/0055311 A1 | 12/2001 | Trachewsky | 370/445 |
| 2002/0103732 A1* | 8/2002 | Bundy | G06Q 40/00 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0190527 A1 | 9/2004 | Okura | 370/395.2 |
| 2004/0196840 A1 | 10/2004 | Amrutur et al. | 370/389 |
| 2004/0202158 A1 | 10/2004 | Takeno | 379/389 |
| 2004/0240442 A1 | 12/2004 | Grimminger | 379/389 |
| 2005/0073958 A1 | 4/2005 | Atlas | 370/238 |
| 2005/0105515 A1 | 5/2005 | Reed | 370/360 |
| 2005/0157724 A1 | 7/2005 | Montuno | 370/392 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0187817 A1 | 8/2006 | Charzinski | 370/216 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Sierecki | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0049610 A1 | 2/2008 | Linwong | 370/225 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0212465 A1 | 9/2008 | Yan | 370/225 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2008/0316916 A1 | 12/2008 | Tazzari | 370/216 |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0196289 A1 | 8/2009 | Shankar | 370/392 |
| 2009/0296710 A1* | 12/2009 | Agrawal | H04L 45/04 370/392 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.53 |
| 2010/0284309 A1 | 11/2010 | Allan et al. | 370/256 |
| 2011/0060844 A1 | 3/2011 | Allan et al. | 709/241 |
| 2011/0063986 A1 | 3/2011 | Denecheau | 370/248 |
| 2011/0090913 A1 | 4/2011 | Kim | 370/400 |
| 2011/0149973 A1 | 6/2011 | Esteve Rothenberg | 370/392 |
| 2011/0228780 A1 | 9/2011 | Ashwood-Smith | 370/392 |
| 2011/0261722 A1 | 10/2011 | Awano | 370/254 |

(56) References Cited

U.S. PATENT DOCUMENTS

| | | | |
|---|---|---|---|
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0063526 A1 | 3/2012 | Xiao | 375/259 |
| 2012/0069740 A1 | 3/2012 | Lu et al. | 370/238 |
| 2012/0069845 A1 | 3/2012 | Carney et al. | 370/392 |
| 2012/0075988 A1 | 3/2012 | Lu | 370/218 |
| 2012/0082034 A1 | 4/2012 | Vasseur | 370/235 |
| 2012/0099861 A1 | 4/2012 | Zheng | 398/45 |
| 2012/0106560 A1 | 5/2012 | Gumaste | 370/401 |
| 2012/0120808 A1 | 5/2012 | Nandagopal et al. | 370/238 |
| 2012/0170461 A1 | 7/2012 | Long | 370/235 |
| 2012/0179796 A1 | 7/2012 | Nagaraj | 709/223 |
| 2012/0213225 A1 | 8/2012 | Subramanian et al. | 370/392 |
| 2012/0218884 A1 | 8/2012 | Kini | 370/228 |
| 2012/0236860 A1 | 9/2012 | Kompella et al. | 370/392 |
| 2012/0243539 A1 | 9/2012 | Keesara | 370/392 |
| 2012/0287818 A1 | 11/2012 | Corti et al. | 370/254 |
| 2012/0307629 A1 | 12/2012 | Vasseur | 370/228 |
| 2013/0003728 A1* | 1/2013 | Kwong | H04L 45/02 370/389 |
| 2013/0051237 A1 | 2/2013 | Ong | 370/237 |
| 2013/0077476 A1 | 3/2013 | Enyedi | 370/225 |
| 2013/0077624 A1 | 3/2013 | Keesara et al. | 370/390 |
| 2013/0077625 A1 | 3/2013 | Khera | 370/390 |
| 2013/0077626 A1 | 3/2013 | Keesara et al. | 370/390 |
| 2013/0114402 A1 | 5/2013 | Ould-Brahim | 370/225 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang et al. | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0160925 A1 | 6/2014 | Xu | 370/235 |
| 2014/0169370 A1 | 6/2014 | Filsfils et al. | 370/392 |
| 2014/0177638 A1 | 6/2014 | Bragg et al. | 370/395.3 |
| 2014/0189156 A1 | 7/2014 | Morris | 709/238 |
| 2014/0192677 A1 | 7/2014 | Chew | 370/254 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0369356 A1 | 12/2014 | Bryant et al. | 370/392 |
| 2015/0023328 A1 | 1/2015 | Thubert et al. | 370/336 |
| 2015/0030020 A1 | 1/2015 | Kini | 370/389 |
| 2015/0109902 A1 | 4/2015 | Kumar | 370/219 |
| 2015/0249587 A1 | 9/2015 | Kozat | 370/222 |
| 2015/0256456 A1 | 9/2015 | Previdi et al. | 370/392 |
| 2015/0263940 A1 | 9/2015 | Kini | 370/236.2 |
| 2015/0326675 A1 | 11/2015 | Kini | 709/224 |
| 2015/0381406 A1 | 12/2015 | Francois | 370/218 |
| 2016/0006614 A1 | 1/2016 | Zhao | 370/254 |
| 2016/0021000 A1 | 1/2016 | Previdi et al. | 370/389 |
| 2016/0119159 A1 | 4/2016 | Zhao | 370/390 |
| 2016/0127142 A1 | 5/2016 | Tian | 370/390 |
| 2016/0173366 A1 | 6/2016 | Saad | 370/218 |
| 2016/0191372 A1 | 6/2016 | Zhang | 370/390 |
| 2016/0352654 A1 | 8/2016 | Filsfils et al. | 370/39 |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2017/0019330 A1 | 1/2017 | Filsfils et al. | 370/389 |
| 2017/0104673 A1 | 4/2017 | Bashandy et al. | 370/392 |
| 2017/0111277 A1 | 4/2017 | Previdi et al. | 370/392 |
| 2017/0302561 A1 | 10/2017 | Filsfils et al. | 370/389 |
| 2017/0346718 A1 | 11/2017 | Psenak et al. | 370/235 |
| 2017/0346737 A1 | 11/2017 | Previdi et al. | 370/392 |
| 2017/0366453 A1 | 12/2017 | Previdi et al. | 370/392 |
| 2018/0083871 A1 | 3/2018 | Filsfils | 370/392 |

FOREIGN PATENT DOCUMENTS

| | | | | |
|---|---|---|---|---|
| CN | 101399 688 A | 4/2009 | | H04L 12/18 |
| CN | 101496 357 A | 7/2009 | | H04L 12/56 |
| CN | 101616 466 A | 12/2009 | | H04W 40/02 |
| CN | 101803 293 A | 8/2010 | | H04L 12/28 |
| CN | 101841 442 A | 9/2010 | | H04L 12/56 |
| CN | 101931 548 A | 12/2010 | | |
| CN | 102098 222 A | 6/2011 | | H04L 12/56 |
| CN | 102132 533 A | 7/2011 | | H04L 12/56 |
| CN | 102299 852 A | 11/2011 | | H04L 12/56 |
| CN | 102498 694 A | 6/2012 | | H04L 12/56 |
| CN | 102714 625 A | 10/2012 | | H04L 12/56 |

OTHER PUBLICATIONS

Psenak, Peter et al., "Enforcing Strict Shortest Path Forwarding Using Strict Segment Identifiers"; U.S. Appl. No. 15/165,794, filed May 26, 2016; (52 pages).

Nainar, Nagendra Kumar et al., "Reroute Detection in Segment Routing Data Plane"; U.S. Appl. No. 15/266,498, filed Sep. 15, 2016; (61 pages).

Frost, Daniel C. et al., "MPLS Segment Routing"; U.S. Appl. No. 15/637,744, filed Jun. 29, 2017; (26 pages).

Filsfils, Clarence et al., "Seamless Segment Routing"; U.S. Appl. No. 15/639,398, filed Jun. 30, 2017; (31 pages).

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya, N., "Segment Routing Implications on BFD"; Sep. 9, 2013; 3 pages.

Alcatel-Lucent, "Segment Routing and Path Computation Element—Using Traffic Engineering to Optimize Path Placement and Efficiency in IP/MPLS Networks"; Technology White Paper; 2015; 28 pages.

Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.

Awduche, Daniel O., et al., "RSVP-TE: Extensions to RSVP for LSP Tunnels," Network Working Group, Internet-Draft, Aug. 2000, pp. 1-12.

Awduche, Daniel O., et al., "RSVP-TE: Extensions to RSVP for LSP Tunnels," Network Working Group, Request for Comments 3209, Dec. 2001, pp. 1-61.

Awduche, D. et al., "Requirements for Traffic Engineering Over MPLS"; Network Working Group; Request for Comments: 2702; Sep. 1999; pp. 1-29.

(56) References Cited

OTHER PUBLICATIONS

Awduche, D. et al., "Overview and Principles of Internet Traffic Engineering"; Network Working Group; Request for Comments: 3272; May 2002; pp. 1-71.
Backes, P. and Rudiger Geib, "Deutsche Telekom AG's Statement About IPR Related to Draft-Geig-Spring-OAM-Usecase-01," Feb. 5, 2014, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Cisco Systems, Inc., "Introduction to Intermediate System-to-Intermediate System Protocol," published 1992 2002; pp. 1-25.
Crabbe, E., et al., "PCEP Extensions for MPLS-TE LSP Protection With Stateful PCE Draft-Crabbe-PCE-Stateful-PCE-Protection-00," Network Working Group, Internet- Draft, Oct. 2012, pp. 1-12.
Crabbe, E., et al., Stateful PCE Extensions for MPLS-TE LSPs, draft-crabbe-pce-stateful-pce-mpls-te-00; Network Working Group, Internet—Draft, Oct. 15, 2012, pp. 1-15.
Deering, S., et al., Cisco, Internet Protocol, Version 6 (IPv6) Specification, Network Working Group, Request for Comments 2460, Dec. 1998, pp. 1-39.
Eckert, T., "Traffic Engineering for Bit Index Explicit Replication BIER-TE, draft-eckert-bier-te-arch-00," Network Working Group, Internet -Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Engineering (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013; pp. 1-28.
Filsfils, C., et al., Cisco Systems, Inc., "Segment Routing Architecture"; draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP"; draft-filsfils-spring-segment-routing-ldp-interop-01.txt; Apr. 18, 2014, pp. 1-16.
Filsfils, C. et al., "Segment Routing Architecture"; draft-ietf-spring-segment-routing-07; Network Working Group, Internet-Draft; Dec. 15, 2015; pp. 1-24.
Filsfils, C. et al.: "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing Use Cases", draft-filsfils-rtgwg-segment-routing-use-cases-02; Network Working Group; Internet-Draft; Oct. 21, 2013; pp. 1-36.
Filsfils, C. et al., "Segment Routing with MPLS Data Plane", draft-ietf-spring-segment-routing-mpls-05; Network Working Group; Internet-Draft; Jul. 6, 2016; 15 pages.
Frost, D., et al., Cisco Systems, Inc., "MPLS Generic Associated Channel (G-ACH) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-ACH) Advertisement Protocol," draft-ietf-mpls-gach-adv-08, Internet-Draft, Jun. 7, 2013, pp. 1-22.

Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Berlin, Jul./Aug. 2013, pp. 1-3.
Geib, R., Deutsch Telekom, "Use Case for a Scalable and Topology Aware MPLS data plane monitoring System," draft-geib-spring-oam-usecase-00; Internet-Draft, Oct. 17, 2013, pp. 1-7.
Geib, R., Deutsch Telekom, "Use Case for a Scalable and Topology Aware MPLS Data Plane Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 196-201.
Kompella, K. et al, Juniper Networks, "Label Switched Paths (LSP) Hierarchy with Generalized Multi-Protocol Label Switching (GMPLS) Traffic Engineering (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00; Network Work Group; Internet-Draft; Jan. 2, 2014, pp. 1-15.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.
Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

(56) References Cited

OTHER PUBLICATIONS

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.
Raszuk, R., NTT 13, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Li, T., et al., Redback Networks, Inc., "IS-IS Extensions for Traffic Engineering," Network Working Group, Request for Comments 5305, Oct. 2008, 17 pages.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Vasseur, JP, et al.; Cisco Systems, Inc. Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

* cited by examiner

| Paths to Router Y | Port Code Chain |
|---|---|
| X-A-C-Y | 4-1-2 |
| • | 4-3-2 |
| X-A-C-D-Y | 4-1-7-9 |
| • | 4-3-7-9 |
| X-A-C-B-D-Y | 4-1-5-7-9 |
| • | 4-3-5-7-9 |
| X-B-D-Y | 3-7-9 |
| X-B-C-D-Y | 3-6-2-9 |
| X-B-C-Y | 3-6-2 |
| X-B-C-D-Y | 3-6-5-9 |

*FIG. 4*

MPLS SEGMENT ROUTING

RELATED APPLICATIONS

The present patent application is a continuation of U.S. patent application Ser. No. 14/717,665, filed May 20, 2015 and entitled "MPLS Segment-Routing," which is a continuation of U.S. patent application Ser. No. 13/760,155 filed on Feb. 6, 2013 (now U.S. Pat. No. 9,049,233 issued on Jun. 2, 2015), which claims domestic benefit under Title 35 of the United States Code § 119(e) of U.S. Provisional Patent Application Ser. No. 61/710,121, entitled "Method For Using Chain Routing," filed Oct. 5, 2012. All of these nonprovisional and provisional applications are incorporated by reference herein in their entirety and for all purposes.

BACKGROUND

In computer networking, a packet is a formatted unit of data carried by a network. A packet typically consists of two kinds of data: control and payload. The control data provides information the network needs to deliver the packet, for example: source and destination addresses, error detection codes like checksums, and sequencing information. Typically, control data is found in packet headers and trailers, with payload data in between.

A router is a device that forwards packets within or between networks. A router can connect to two or more data lines from different networks. When a data packet arrives via one of the lines, the router can read address information in the packet to determine its ultimate destination. Then, using information in a routing table or routing policy, the router can direct the packet towards its destination.

BRIEF DESCRIPTION OF THE DRAWINGS

The present disclosure may be better understood, and its numerous objects, features, and advantages made apparent to those skilled in the art by referencing the accompanying drawings.

FIG. 4 illustrates an example set of paths calculated by the router of FIG. 3.

DETAILED DESCRIPTION

Overview

Figure 1:
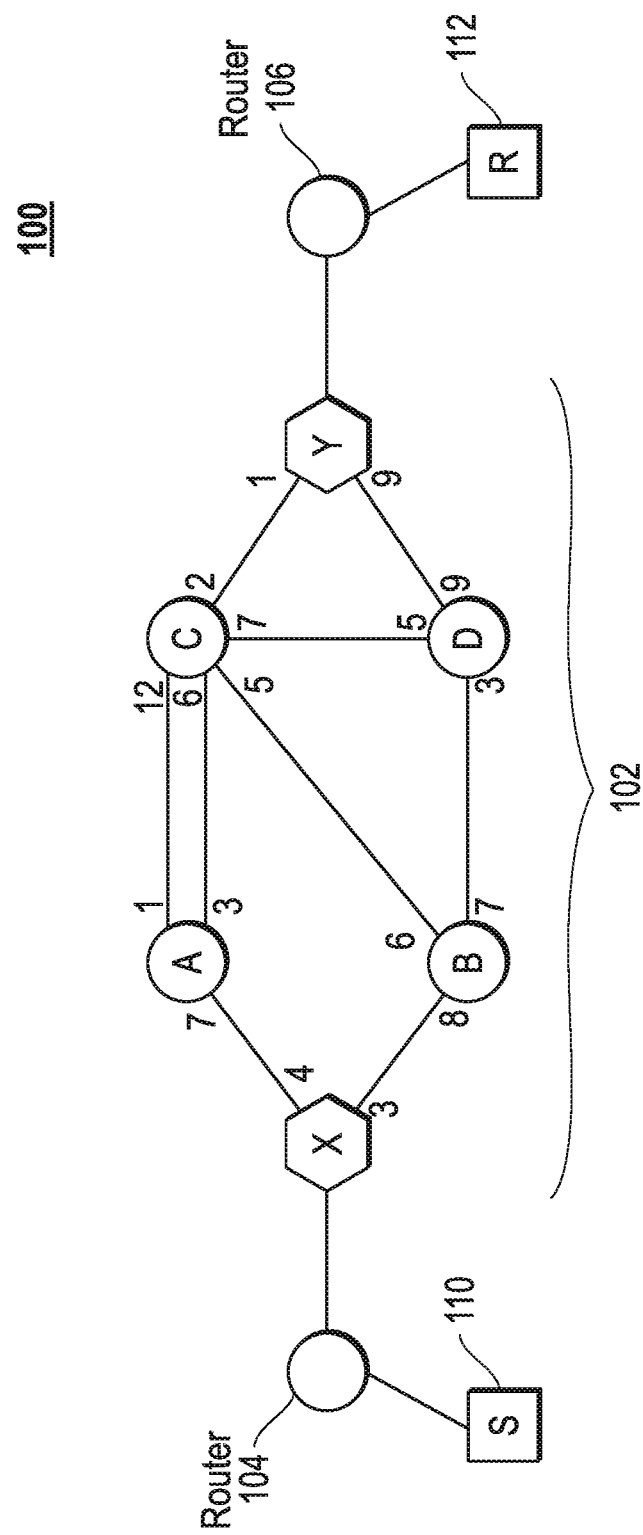
FIG. 1 is a block diagram illustrating an example network.

MPLS segment routing is disclosed. In one embodiment, a first core router generates a first data structure that maps first portcodes to identities of respective first neighbor routers or respective first links. The first portcodes identify respective first ports of the first core router, and the first ports are coupled to the first neighbor routers, respectively, via the first links, respectively. The first core router generates and transmits a first link-state packet that comprises an identity of the first core router and the first data structure.

Routing

Routing is a process for forwarding network traffic (e.g., packets) to destinations. Routing is performed in many kinds of networks. In Multiprotocol Label Switching (MPLS) networks, packet routing usually follows one of two basic paradigms: routing based on a destination Internet Protocol (IP) address using information in an IP routing or forwarding table, or routing based on following an explicit path through the network that was constructed, for example, via traffic engineering extensions to the Resource Reservation Protocol (RSVP-TE).

This disclosure describes a method for directing a packet along a specific path in an MPLS enabled network, it being understood the claims below should not be limited to use in MPLS enabled networks. Further, the method described in this disclosure can direct a packet along a specific path without requiring a RSVP-TE created, pre-existing traffic-engineered path.

The method may provide a variety of advantages. For example, the method described herein may be advantageous when used in conjunction with Operations, Administration, and Maintenance (OAM) operations in MPLS enabled networks that are subject to Equal Cost Multipath (ECMP) load balancing. ECMP is a routing strategy where next-hop packet forwarding to a single destination can occur over multiple "best paths" which tie for top place in routing metric calculations. In an MPLS enabled network, which is subject to behavior in which traffic transmitted between node A and node B may traverse multiple paths between A and B due to ECMP load-balancing, implementation of OAM operations may be challenging. OAM operations, which are designed to monitor or measure path variables such as packet loss or transmission delay, may be frustrated by ECMP since there may be no way to specify a path that an OAM packet follows without creating a traffic-engineered tunnel for the OAM packet.

Routing Tables

Routing tables can be used in MPLS enabled networks to forward packets. Routing tables may be stored in network nodes such as routers, and list the routes to particular destinations, and in some cases, metrics (e.g., distances) associated with those routes. For purposes of explanation only, network nodes are described herein primarily as routers. However, a network node may include any suitable combination of one or more routers, one or more bridges, one or more switches, and any other suitable communications processing devices.

The construction of routing tables is one of the primary goals of routing protocols. There are many types of routing protocols. Interior gateway protocol (IGP) is a routing protocol that exchanges routing information within an autonomous system for the purpose of creating routing tables. In contrast, the exterior gateway protocol (EGP) is used for determining network reachability between autonomous systems, but makes use of IGP. An autonomous system is a single routing domain, such as a network, controlled by one individual or organization.

IGP can be divided into several categories, one of which is the link-state routing protocol. The basic concept behind the link-state routing protocol, such as the intermediate system to intermediate system (IS-IS), is that every router constructs a topological map of network connectivity in the form of a graph, showing which routers are connected to which other routers. Each router can use its map to independently calculate the best logical path from it to every possible destination in the network. The collection of best paths will then form the routing table.

Construction of a routing table may be achieved through several steps. First, each router identifies its neighbor routers, or the routers that are directly connected to it over fully functioning communication links. A router may accomplish this using a simple reachability protocol that it runs separately with each of its directly connected neighbor routers. Next, each router periodically and in case of connectivity changes, creates a short message called a link-state packet that identifies the router and all other routers to which it is directly connected. The link-state packet may also include a sequence number, which increases every time the router generates a new version of a link-state packet. Once created, the link-state packet is flooded throughout the network.

Each router in the network may remember, for every other router in the network, the sequence number of the last link-state packet the router receives. When a link-state packet is received, the router looks up the sequence number the router has stored for the advertising router (i.e., the router that originally created the link-state packet, the identity of which is contained in the link-state packet). If this link-state packet is newer than what is saved, a copy is forwarded to each of that router's neighbors. This procedure rapidly gets a copy of the latest version of each router's link-state packet to every router in the network.

With a complete set of link-state packets, a router can produce a map of the network. The algorithm for this process simply iterates over information contained in the collection of link-state packets; for each one, the algorithm makes links on the map of the network, from the router that sent that link-state packet, to all the routers the packet indicates are directly coupled neighbors. Once each router knows about all the other routers and the links connecting them, it can run a Dijkstra Shortest Path First algorithm to determine and record the shortest path from itself to all the other routers. This process may also include producing a routing table.

Mpls

In contrast to IP, which forwards packets based on network addresses and routing tables, MPLS forwards packets from one router to the next based on short path-labels (hereinafter labels). It is noted that MPLS enabled routers can receive and transmit an IP packet (non-MPLS) using routing tables.

MPLS networks can transmit packets via a label switched path (LSP). Packets can enter an MPLS network via an ingress label switch router (LSR), travel along an LSP of one or more core LSRs, and exit via an egress LSR. In general, ingress LSRs of MPLS networks assign labels to incoming data packets. When assigning a label to an incoming packet, the ingress LSR may look at information (e.g., the source and/or group address) of the packet's IP header and also some other information such as the interface at which the packet arrived, to determine the appropriate label to assign. Ingress LSRs may classify each packet potentially using a range of attributes, not just the packet's destination address, to determine which LSP to use. Labeled packets are forwarded downstream along an LSP that may include several core LSRs, each of which decides which way to forward a packet based on the label attached to the packet it receives. More particularly, LSRs can use label information base (LIB) tables to map the label of the packet it receives to an outgoing label and an outgoing interface. This may allow the use of very fast and simple forwarding engines, which are often implemented in hardware. The LSR swaps the label of the packet with the mapped outgoing label, which tells the next-hop LSR in the LSP how to forward the packet. The packet is transmitted to the next-hop LSR via the outgoing interface that is also identified in the LIB. The LSRs forward the packet in a hop-by-hop fashion until the packet reaches an egress LSR. In this fashion, LSRs make forwarding decisions based on a label. Since MPLS uses the label to forward packets, it is protocol-independent, hence the term "Multi-Protocol" in MPLS. MPLS may be used to carry any content (not only packets).

There are two major standardized control protocols for managing MPLS paths: Label Distribution Protocol (LDP) and RSVP-TE, an extension of the resource reservation protocol (RSVP) for traffic engineering. Unfortunately, creation of LSPs through an MPLS network using LDP or RSVP-TE can be computationally expensive.

LDP is a protocol defined by the IETF (RFC 5036) for the purpose of distributing labels in an MPLS environment. In LDP, two routers with an established session are called LDP peers, and they exchange information including locally relevant MPLS labels. LDP relies on the underlying routing tables provided by IGP. Unlike TE paths, which use constraints and explicit routes to establish end-to-end LSPs, LDP is used for signaling best effort LSPs. While the path created using LDP or RSVP-TE can be employed to move packets through an MPLS network, the entire path through the network is not necessarily known by the ingress LSR when the ingress LSR receives a packet for forwarding. Rather, the ingress LSR may simply know that the packet it receives will reach a destination egress LSR if the appropriate label is attached to it.

Segment Routing

Segment routing specifies a path that a packet will take through a network using a stack of portcodes. In one embodiment of segment routing, a packet is encapsulated with a header that includes a stack of portcodes. The packet and header can be forwarded through a network by popping off the top most portcode from the stack at each hop, and forwarding the packet with header to the next hop via the exit port of the router that is mapped to the popped portcode. The following describes how portcode stacks may be created and used in greater detail.

FIG. 1 illustrates in block diagram form relevant components of an example MPLS enabled network 102 that can transmit packets using segment routing. For purposes of explanation, each router in network 102 employs MPLS and IGP or modified versions thereof. For ease of illustration, each router in FIG. 1 is referred to as an LSR. It should be understood that the term network should not be limited to that shown within FIG. 1. Networks may be significantly more complex than the example shown in FIG. 1.

Each of the LSRs of network 102 is assigned an identity (e.g., an IP address). Core LSRs in FIG. 1 are identified as A-D, while edge LSRs are identified as X and Y. Each router has a plurality of interfaces or ports that are coupled to communication links. Each of the ports is associated with a portcode. For example, core LSR A includes at least three ports associated with portcodes "1," "3," and "7." Two ports of core LSR A are coupled to core LSR C via separate communication links and assigned portcodes "1" and "3." In one embodiment, the portcodes may take form in 20-bit MPLS labels generated within the routers.

As shown in FIG. 1, edge LSRs X and Y are in data communication with routers 104 and 106, respectively, which are external to network 102. In this configuration, edge LSR X can receive data packets from a source S (e.g., a server) via router 104. These packets are ultimately destined for receiver R (e.g., a desktop computer) via router 106. Edge LSR X can transmit these data packets it receives to edge LSR Y via a path selected by edge LSR X that goes through two or more core LSRs. This path may be predetermined, or the path may be calculated on the fly, i.e., when edge LSR X receives the packet. Edge LSR X may also be capable of generating OAM packets for transmission to other LSRs in network 102 including edge LSR Y, for example, in order to measure or monitor specific paths within network 102. LSR X can attach a stack of portcodes to the packets that corresponds to the selected path. The portcode stack may be predetermined or the portcode stack may be calculated on the fly, i.e., when LSR X receives the packet. As will be more fully described, the stack of portcodes tells the LSRs in the path how to route the packet to the destination LSR.

Figure 2:
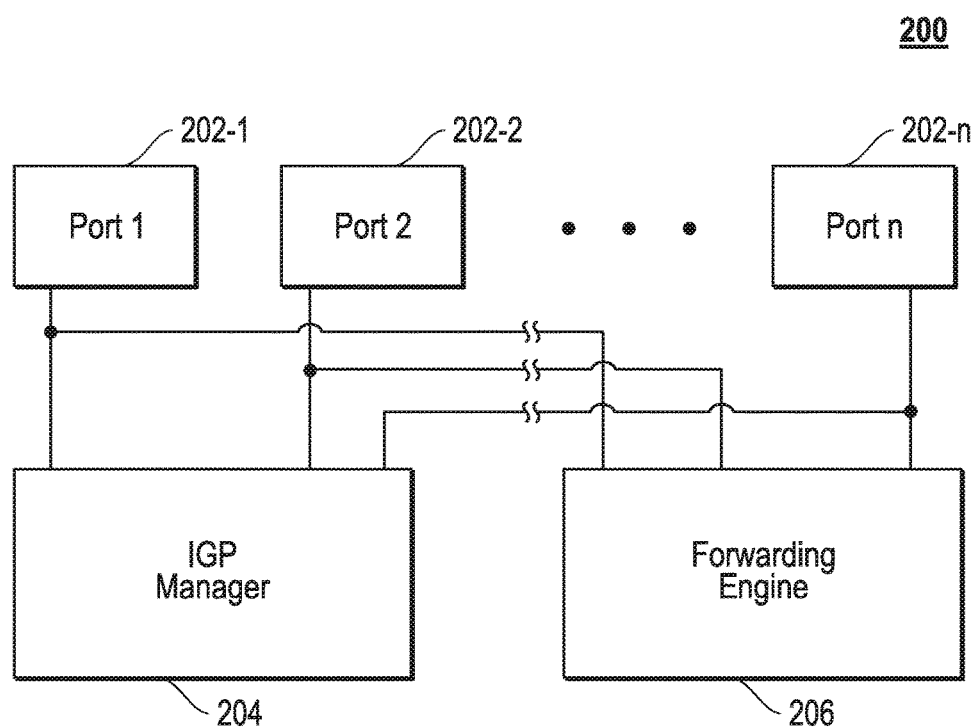
FIG. 2 is a block diagram illustrating an example router that can be employed in the network of FIG. 1.

FIG. 2 illustrates in block diagram form certain components of an example core LSR 200 within network 102. Core LSR 200 includes a plurality of ports 202 that are coupled to neighbor LSRs via functioning communication links. Each port 202 is identified by a respective portcode. In the embodiment shown, core LSR 200 also includes an IGP manager 204 in data communication with a packet forwarding engine 206. Each of IGP manager 204 and packet forwarding engine 206 may be implemented using a suitable combination of hardware, firmware, and software. In one embodiment, each of IGP manager 204 and packet forwarding engine 206 may be implemented using instructions executing on one or more processors of core LSR 200. It is note that core LSR 200 may include additional components, such as a network topology generator.

IGP manager 204 may be configured to generate link-state packets similar to the link state packets described above. These link-state packets can be used to flood the network 102 with core LSR 200 related information, including a table or other data object that maps portcodes to neighbor LSR identities (e.g., IP addresses or other identities) or the communication links therebetween. For purposes of explanation only, it will be presumed that the portcodes are mapped to neighbor LSRs or to the links to neighbor LSRs, it being understood that the claims below should not be limited thereto. LSRs in network 102 can use the mappings between portcodes and neighbor LSR identities to create portcode stacks as will be more fully described below.

IGP manager 204 may be capable of implementing a reachability protocol to identify neighbor LSRs (i.e., LSRs directly coupled by a functioning communication link via a respective port 202). Once the neighbor LSRs are identified, IGP manager 204 maps the neighbor LSRs' identities (e.g., IP addresses) to portcodes, respectively, for the ports 202, respectively, through which the respective neighbor LSRs can be reached. Thereafter, IGP manager 204 may create a link-state packet that contains a table or other object that maps the identities of the neighbor LSRs to respective portcodes. This link-state packet should also include the identity (e.g., IP address) of core LSR 200. Additional information may be contained in the link state packet. For example, the link state packet may contain a sequence number that is incremented each time IGP manager 204 generates a link-state packet. Additionally, the link-state packet may also contain a separate list of identities for the reachable neighbor LSRs, which may be used to create a topology map. Eventually, IGP manager 204 may flood network 102 with the link-state packet. In one embodiment, the link-state packet can be flooded via the forwarding engine 206.

Figure 3:
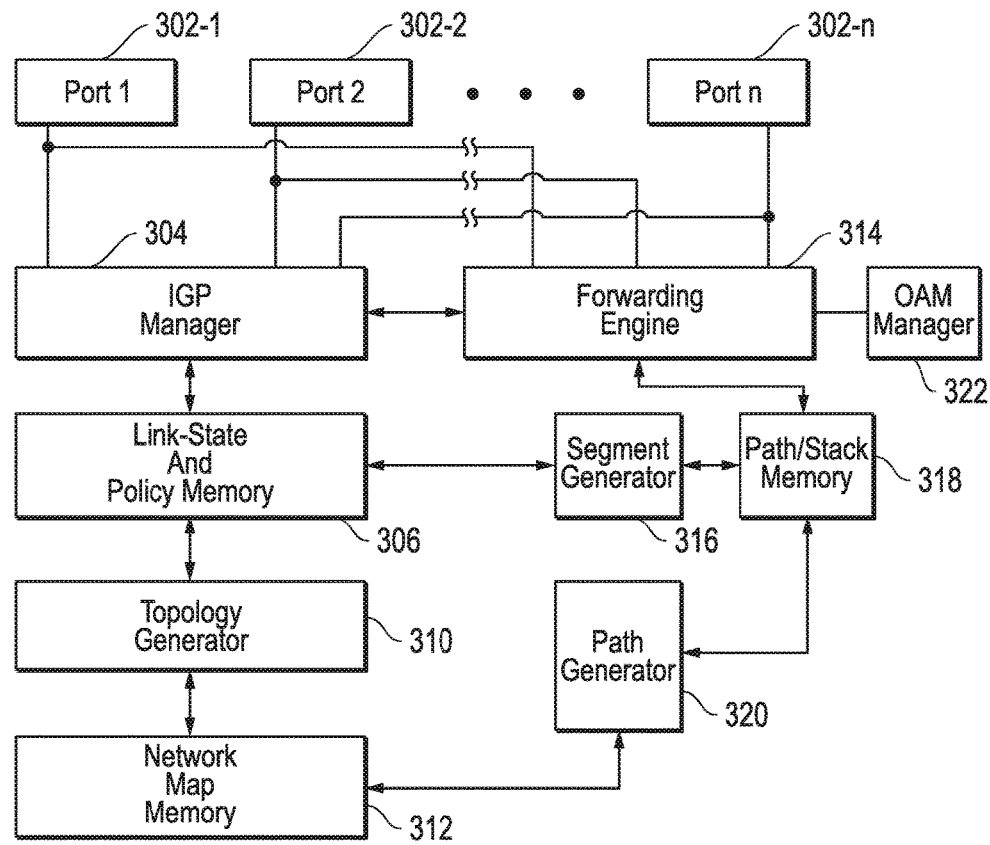
FIG. 3 is a block diagram illustrating an example of another router that can be employed in the network of FIG. 1.

FIG. 3 illustrates certain components of the example edge LSR X shown within FIG. 1. The LSR shown in FIG. 3 is just one example of edge LSRs that can be employed in a network. LSR X includes an IGP manager 304, which may be implemented using any suitable combination of hardware, firmware, and software. For example, LSR X may be implemented using software instructions executing on one or more processors. The IGP manager 304 may operate according to many of the principles of IGP described above. IGP manager 304 is capable of receiving link-state packets from other LSRs of network 102 via ports 302. These received link-state packets may be similar to the link-state packet examples described with reference to FIG. 2. Each link-state packet identifies the advertising LSR (i.e., the LSR from which the link-state packet originated) and all neighbor LSRs to which the advertising router is directly connected. Additionally, the link-state packet may include a table or other object that maps the identities of the neighbor LSRs and respective portcodes that identify the ports of the advertising router coupled to the neighbor LSRs. The link-state packets may contain additional information such as a sequence number. IGP manager 304 stores information from the link-state packets in link-state and policy memory 306 (hereinafter link-state memory 306).

For each link-state packet it receives, IGP manager 304 may store in link-state memory 306 the identity of the LSR that advertised the link-state packet and the identities of LSRs that are neighbors to the advertising LSR. IGP manager 304 may also store the table that maps LSR or link identities to portcodes. FIG. 3 illustrates example tables stored by LSR X in link-state memory 306 for routers identified as A-D and Y in response to receiving corresponding link-state packets. As shown, each table is stored with and identified by the LSR that advertised the table. The tables can be used to create portcode stacks as will be more fully described below. Link-state memory 306 may also store additional information such as policy considerations used by LSR X when forwarding packets.

When IGP manager 304 receives a complete set of link-state packets for the network 102, topology map generator 310 can process information of the link-state packets stored in link-state memory 306 and generate a network map for storage in network map memory 312. The algorithm employed by map generator 310 for this process may iterate over information in link-state memory 306. For example, for each table and LSR identity, map generator 310 may make links on the map of network 102, from the identified LSR to all the LSRs the table indicates are directly coupled neighbors. Topology map generator 310 may be implemented using any suitable combination of hardware, firmware, and software. In certain embodiments, topology map generator 310 may be implemented using instructions executing on one or more processors.

A path or route generator 320 can calculate paths to other LSRs within network 102 based upon the topological map contained within network map memory 312. Route generator 320 may calculate paths to a destination LSR before the router receives a packet to be delivered to that destination LSR, or route generator 320 may calculate paths to a destination LSR when the router receives a packet to be delivered to that destination LSR. Each path may be calculated as a sequence of hops between LSR X and a destination LSR (e.g., edge LSR Y). The sequence can be expressed in the identities of LSRs or communication links in the path. For purposes of explanation, the paths generated will be expressed as a sequence of LSR identities it being understood the claims below should not be limited thereto. The paths can optionally omit the identity of LSR X. The paths to each destination LSR can be stored in path/stack memory 318. FIG. 4 illustrates an example set of paths calculated by generator 320 from LSR X to LSR Y, each of which is defined by a sequence of LSR identities. Path or route generator 320 may be implemented using any suitable combination of hardware, firmware, and software. In certain embodiments, path or route generator 320 may be implemented using instructions executing on one or more processors.

Segment generator 316 can calculate at least one portcode stack for each path in path/stack memory 318. Segment generator 316 can pre-calculate portcode stacks for the paths, or segment generator 316 can calculate a portcode stack when it is needed. In one embodiment, segment generator 316 uses the tables in link-state memory 306 that map LSR identities to portcodes during this process. Segment generator 316 may be implemented using any suitable combination of hardware, firmware, and software. In certain embodiments, segment generator 316 may be implemented using instructions executing on one or more processors.

Figure 5:
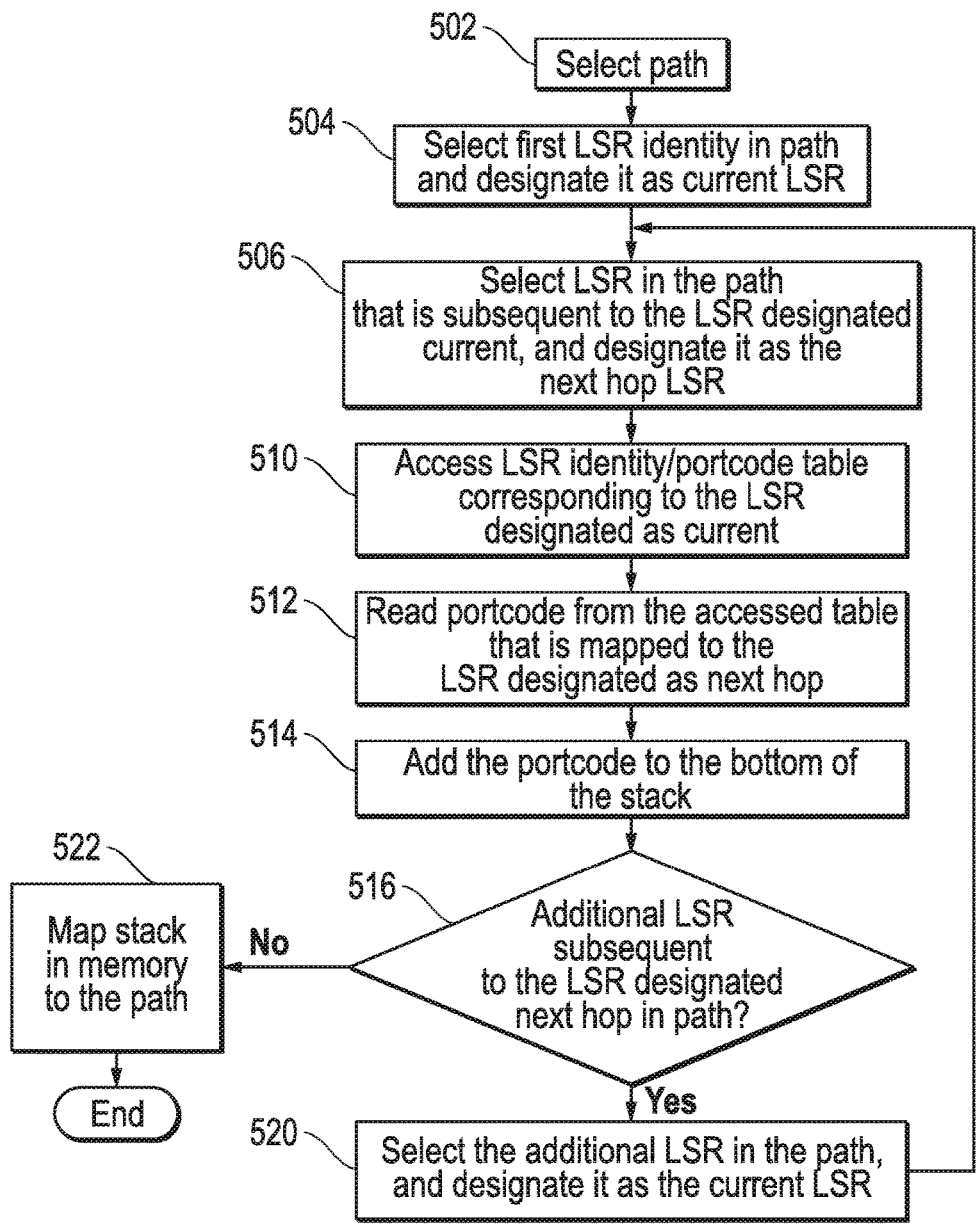
FIG. 5 is a flow chart illustrating certain aspects of a process implemented by a router such as that shown in FIG. 3.

FIG. 5 illustrates a flow chart that describes certain aspects of an example method of creating a portcode stack. In particular as shown in FIG. 5, the method starts when segment generator 316 selects a particular path in path/stack memory 318. At 504, segment generator 316 selects the first LSR identified in the path and tags it as the "current" LSR. For example, in the path from LSR X to LSR Y that consists of LSR hops X-B-D-Y, X, the first LSR is selected as the initial "current" LSR. In step 506 generator 316 selects the next hop LSR according to the selected path and tags it as the "next hop" LSR. In step 510, the identity of the LSR designated "current" is then used to access the corresponding LSR identity/portcode table in link-state memory 306. In step 512, the portcode mapped to the identity of the LSR designated "next hop" is read from the accessed table. This portcode is added to the stack as shown in step 514. Generator 316 then determines whether another hop is contained within the selected path. If so, generator 316 in step 520 retags the LSR designated as "next hop" to "current." Thereafter, steps 506-516 may be repeated. Ultimately, when the last portcode is added to the stack in step 514, or in other words, when the last hop LSR in the path is identified, the process ends, and generator 316 maps the portcode stack to the path in path/stack memory 306 in step 522. FIG. 4 illustrates example portcode stacks created by generator 316 that are mapped to paths in path/stack memory 318.

Once a portcode stack is created, LSR X can use it to transmit a packet through network 102. With continuing reference to FIGS. 1 and 3, packet forwarding engine 314 may be connected to each of the ports 302. Forwarding engine 314 may be implemented using any suitable combination of hardware, firmware, and software. In certain embodiments, forwarding engine 314 may be implemented using instructions executing on one or more processors of LSR X.

Forwarding engine 314 may receive a packet, such as a data packet, from one of the ports 302 connected to router 104, or packet forwarding engine 314 may receive an OAM packet from OAM manager 322. Packet forwarding engine 314 uses information contained within the received packet, such as the source and/or destination address to select one of several paths in path/stack memory 318 that can reach an LSR for which the packet is destined if the paths preexist in path/stack memory 318. For example, forwarding engine 314 may receive a data packet from router 104 that is ultimately destined for receiver R. The forwarding engine 314 can use information contained in the packet to determine that edge LSR Y shown in FIG. 1 is the destination within network 102 where the packet should be sent in order to reach receiver R, the final destination.

There are many paths that can be selected to forward the received packet to edge router Y. FIG. 4 illustrates example preexisting paths in path/stack memory 318 that can be selected. In the embodiment where paths and/or portcode stacks are created on the fly, path/stack memory 318 may not store the paths of interest at the time the packet is received, and in this embodiment route generator 320 may use information in the received packet to calculate one or more paths for storage in path/stack memory 318. The forwarding engine can use policy information in link-state memory 306 to select an appropriate path of the paths in path/stack memory 318. For example, the forwarding engine 314 could select a path that has fewest number of hops to edge LSR Y. In an attempt to load balance, forwarding engine 314 may select a path to edge LSR Y that does not contain the fewest number of hops. Regardless, forwarding engine 314 selects one of the paths in accordance with policies stored in link-state memory 306 or any of several selection algorithms Thereafter, forwarding engine 314 reads the portcode stack mapped to the selected path in path/stack memory 318 if the portcode stack preexists in path/stack memory 318. In the embodiment where paths and/or portcode stacks are created on the fly, path/stack memory 318 may not store the portcode stack of interest at the time the packet is received, and in this embodiment the portcode stack can be calculated for the path by segment generator 316 and mapped to the path in path/stack memory 318. Once the path is selected or calculated on the fly, the corresponding portcode stack is added to the MPLS header that encapsulates the packet, and the packet with header is subsequently forwarded out of the port 302 identified by the portcode on top of the stack. In one embodiment, the portcode on top of the stack is popped off before the packet with header is forwarded to the next hop LSR within network 102.

With continuing reference to FIGS. 1-3, when a core LSR, such as core LSR 200 shown in FIG. 2, receives a packet with a portcode stack, the forwarding engine 314 of the core LSR pops off the portcode from the top of the stack and forwards the packet along with the portcode stack to the next hop LSR via the port identified by the popped portcode. This process may be continued in the downstream hops until the data packet reaches its destination (e.g., edge router Y). If the core router is the penultimate hop in the path to the destination LSR, the portcode stack will contain no further portcodes in one embodiment.

Figure 6:
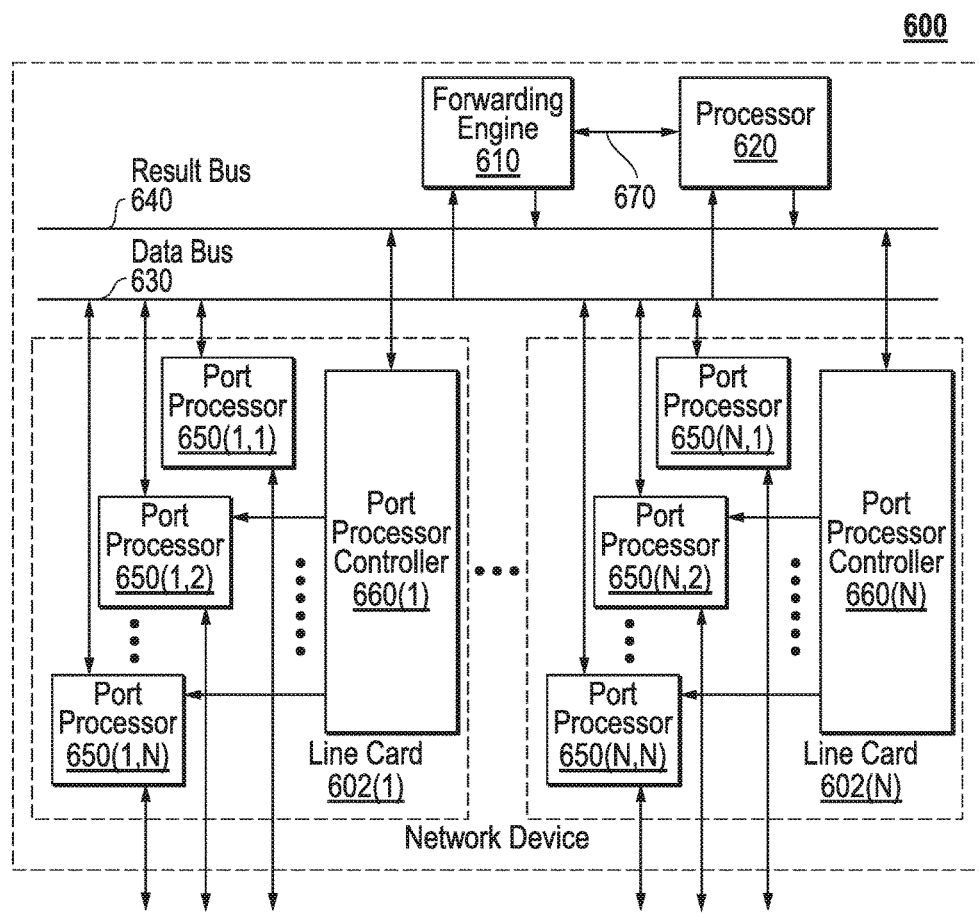
FIG. 6 is a block diagram illustrating certain components of an example router that can be employed in the network of FIG. 1.

FIGS. 2 and 3 above illustrate relevant components of example LSRs employed in network 102. FIG. 6 is a block diagram illustrating certain additional and/or alternative components of LSRs that can be employed in network 102. In this depiction, LSR 600 includes a number of line cards (line cards 602(1)-(N)) that are communicatively coupled to a forwarding engine or packet forwarder 610 and a processor 620 via a data bus 630 and a result bus 640. Line cards 602(1)-(N) include a number of port processors 650(1,1)-(N,N) which are controlled by port processor controllers 660(1)-(N). It will also be noted that forwarding engine 610 and processor 620 are not only coupled to one another via data bus 630 and result bus 640, but are also communicatively coupled to one another by a communications link 670.

The processors 650 and 660 of each line card 602 may be mounted on a single printed circuit board. When a packet is received, the packet may be identified and analyzed by router 600 in the following manner Upon receipt, a packet (or some or all of its control information) is sent from the one of port processors 650(1,1)-(N,N) at which the packet was received to one or more of those devices coupled to data bus 630 (e.g., others of port processors 650(1,1)-(N,N), forwarding engine 610 and/or processor 620). Handling of the packet can be determined, for example, by forwarding engine 610. For example, forwarding engine 610 may determine that the packet should be forwarded to one or more of port processors 650(1,1)-(N,N). This can be accomplished by indicating to corresponding one(s) of port processor controllers 660(1)-(N) that the copy of the packet held in the given one(s) of port processors 650(1,1)-(N,N) should be forwarded to the appropriate one of port processors 650(1,1)-(N,N). In addition, or alternatively, once a packet has been identified for processing, forwarding engine 610, processor 620 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present disclosure has been described in connection with several embodiments, the disclosure is not intended to be limited to the specific forms set forth herein. On the contrary, it is intended to cover such alternatives, modifications, and equivalents as can be reasonably included in the scope of the disclosure as defined by the appended claims.

What is claimed is:

1. A method comprising:
   generating, at a first router within a network, a first link-state packet comprising a first data structure, wherein
      the first data structure maps a first portcode to
         a link connecting the first router within the network, or
         a first neighbor router reachable from the first router;
   receiving an incoming data packet, wherein
      the incoming data packet is encapsulated with a header comprising an incoming portcode stack, and
      the incoming portcode stack comprises the first portcode as its uppermost portcode;
   removing the first portcode from the incoming portcode stack to create an outgoing portcode stack for an outgoing data packet; and
   forwarding the outgoing data packet via a port, of the first router, identified by the first portcode, wherein
      an uppermost portcode in the outgoing portcode stack identifies a port of the first neighbor router.

2. The method of claim 1, further comprising sending the first link-state packet to routers throughout the network.

3. The method of claim 1, wherein the first link-state packet further comprises identity information for the first router.

4. The method of claim 1, wherein the first link-state packet further comprises identity information for neighbor routers of the first router.

5. The method of claim 1, wherein generating the first link-state packet comprises identifying neighbor routers to the first router.

6. The method of claim 5, wherein generating the first link-state packet further comprises mapping identity information for a neighbor router to a portcode assigned to a port via which the neighbor router can be reached.

7. The method of claim 1, further comprising:
   receiving, at the first router, a second link-state packet comprising a second data structure, wherein
      the second link-state packet is generated by a second router within the network, and
      the second data structure maps a second portcode to
         a link connecting the second router within the network, or
         an additional router reachable from the second router.

8. A communications processing device, comprising:
   one or more ports adapted to
      connect the communications processing device within a network,
      receive an incoming data packet, wherein
         the incoming data packet is encapsulated with a header comprising an incoming portcode stack, and
         the incoming portcode stack comprises the first portcode as its uppermost portcode, and
      forward an outgoing data packet; and
   a processor adapted to
      generate a first link-state packet comprising a first data structure, wherein the first data structure maps the first portcode to
         a link connecting the device within the network, or
         a first neighbor communications processing device reachable via the one or more ports,
      remove the first portcode from the incoming portcode stack to create an outgoing portcode stack for the outgoing data packet, wherein
         an uppermost portcode in the outgoing portcode stack identifies a port of the first neighbor communications processing device, and
      select from among the one or more ports a port identified by the first portcode for forwarding of the outgoing data packet.

9. The communications processing device of claim 8, wherein the processor is further adapted to
   send, via the one or more ports, the first link-state packet to additional communications processing devices throughout the network.

10. The communications processing device of claim 8, wherein the first link-state packet further comprises identity information for the communications processing device.

11. The communications processing device of claim 8, wherein the first link-state packet further comprises identity information for neighbor communications processing devices of the communications processing device.

12. The communications processing device of claim 8, wherein the processor is further adapted to identify neighbor communications processing devices of the communications processing device.

13. The communications processing device of claim 12, wherein the processor is further adapted to map identity information for a neighbor communications processing device to a portcode assigned to a port, among the one or more ports, via which the neighbor communications processing device can be reached.

14. The communications processing device of claim 8, wherein the one or more ports are further adapted to receive a second link-state packet comprising a second data structure, wherein
   the second link-state packet is generated by a second communications processing device within the network, and
   the second link-state packet maps a second portcode to
      a link connecting the second communications processing device within the network, or an additional communications processing device reachable from the second communications processing device.

15. A non-transitory computer readable medium comprising executable instructions, wherein a method is implemented via execution of the instructions, the method comprising:
generating, at a first router within a network, a first link-state packet comprising a first data structure, wherein
the first data structure maps a first portcode to
a link connecting the first router within the network, or
a first neighbor router reachable from the first router;
receiving an incoming data packet, wherein
the incoming data packet is encapsulated with a header comprising an incoming portcode stack, and
the incoming portcode stack comprises the first portcode as its uppermost portcode;
removing the first portcode from the incoming portcode stack to create an outgoing portcode stack for an outgoing data packet; and
forwarding the outgoing data packet via a port, of the first router, identified by the first portcode, wherein
an uppermost portcode in the outgoing portcode stack identifies a port of the first neighbor router.

16. The non-transitory computer readable medium of claim 15, wherein the method further comprises sending the first link-state packet to routers throughout the network.

17. The non-transitory computer readable medium of claim 15, wherein the first link-state packet further comprises identity information for the first router.

18. The non-transitory computer readable medium of claim 15, wherein the first link-state packet further comprises identity information for neighbor routers of the first router.

19. The non-transitory computer readable medium of claim 15, wherein generating the first link-state packet further comprises mapping identity information for a neighbor router to a portcode assigned to a port via which the neighbor router can be reached.

20. The non-transitory computer readable medium of claim 15, wherein the method further comprises:
receiving, at the first router, a second link-state packet comprising a second data structure, wherein
the second link-state packet is generated by a second router within the network, and
the second data structure maps a second portcode to
a link connecting the second router within the network, or
an additional router reachable from the second router.

* * * * *